C. B. WEAVER.
METHOD OF MAKING IRREGULARLY SHAPED STAMPINGS.
APPLICATION FILED JULY 19, 1916.
1,308,769.
Patented July 8, 1919.
6 SHEETS—SHEET 1.
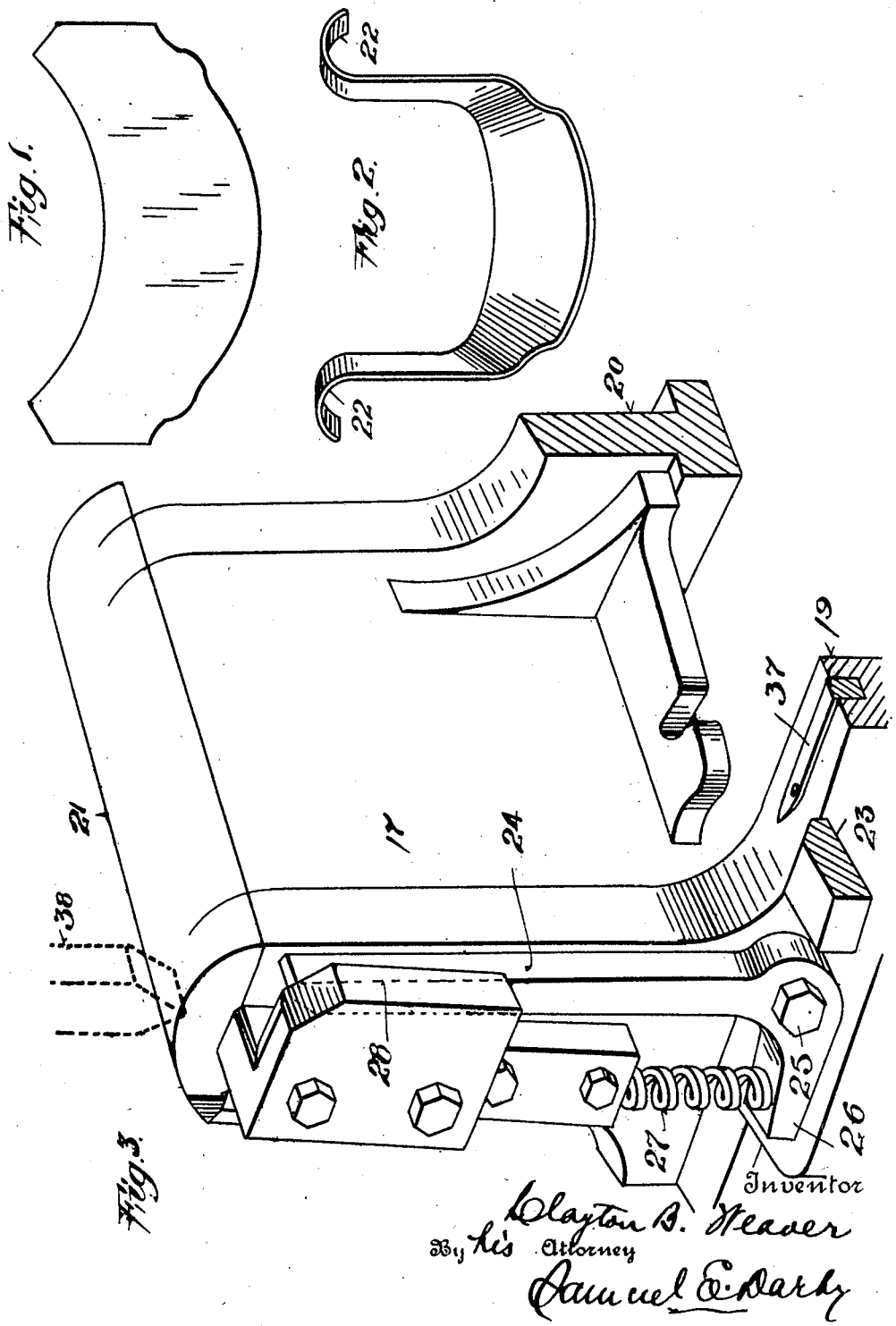

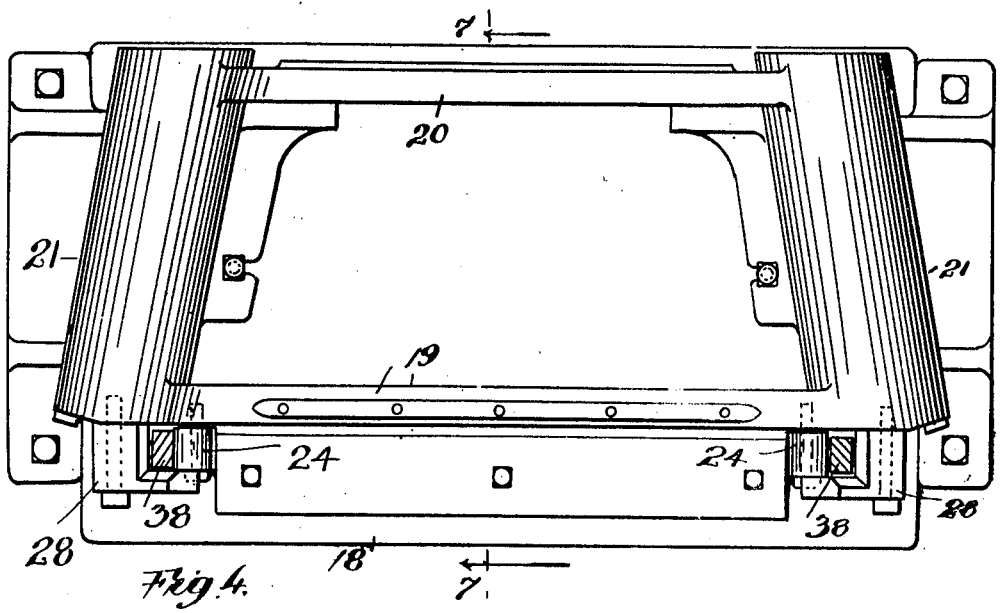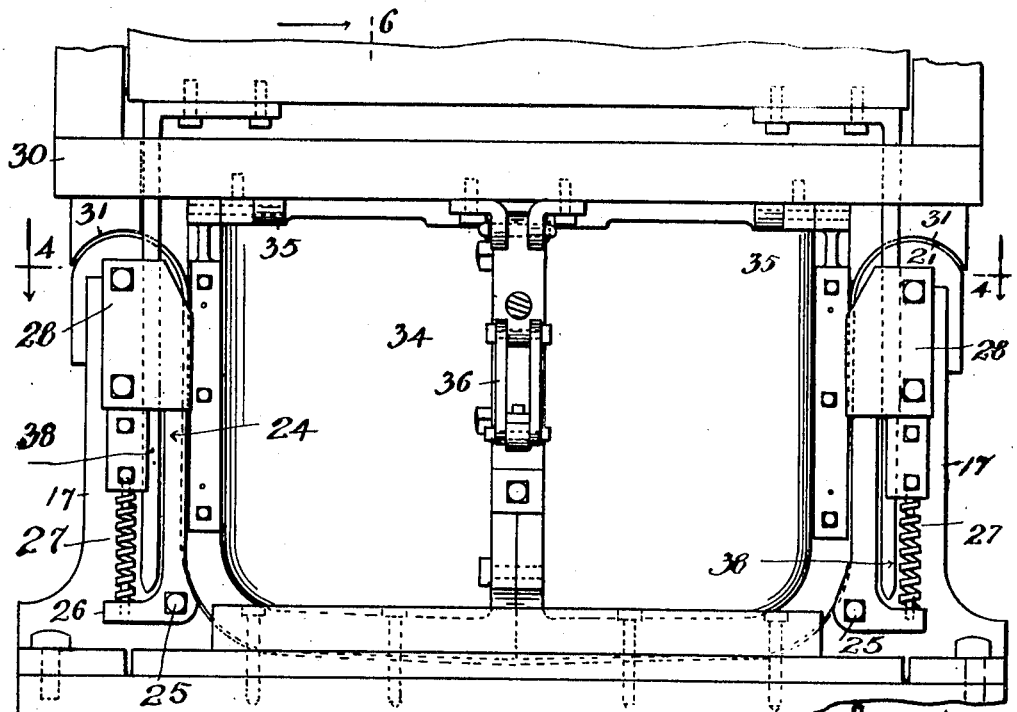

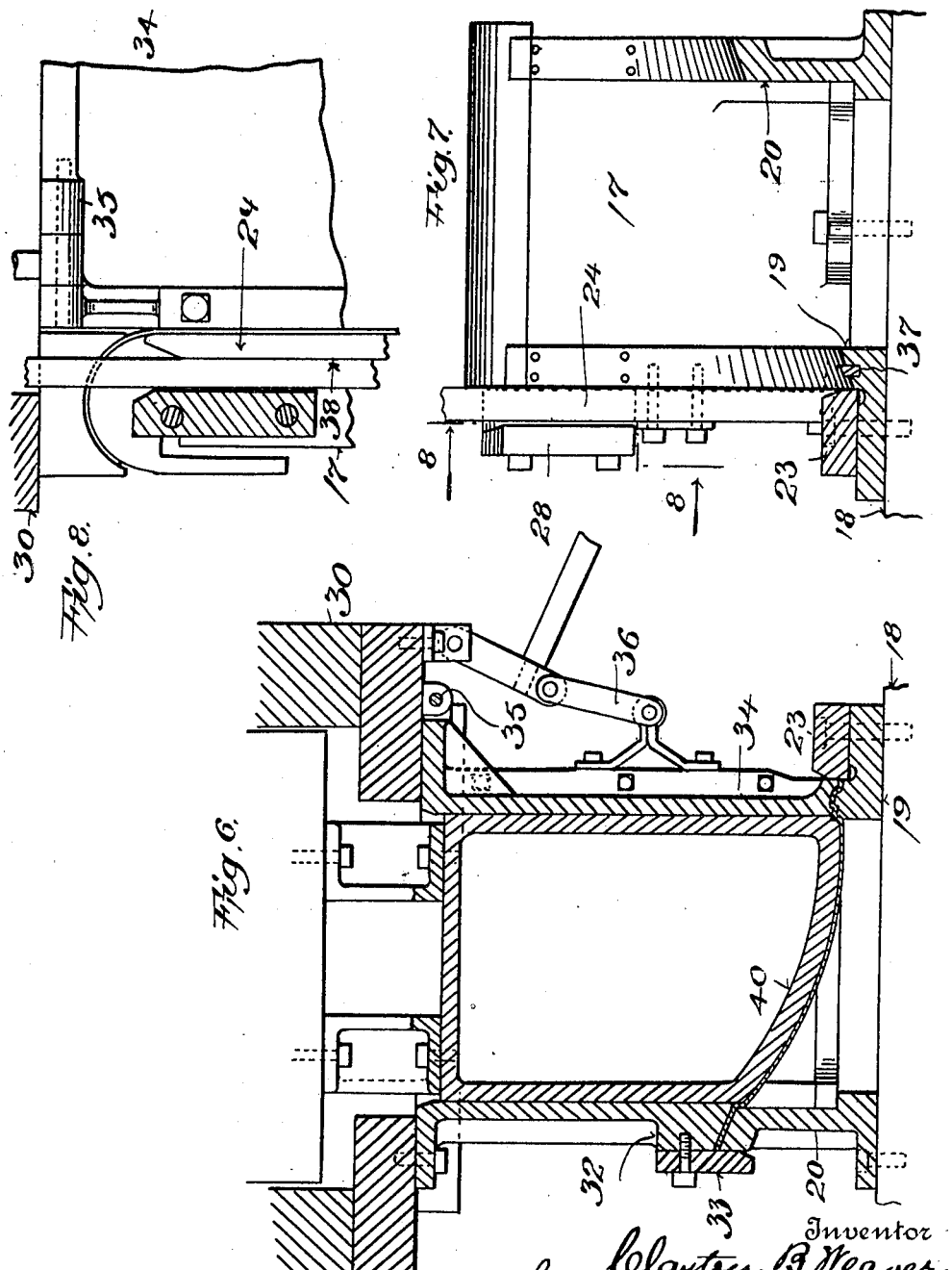

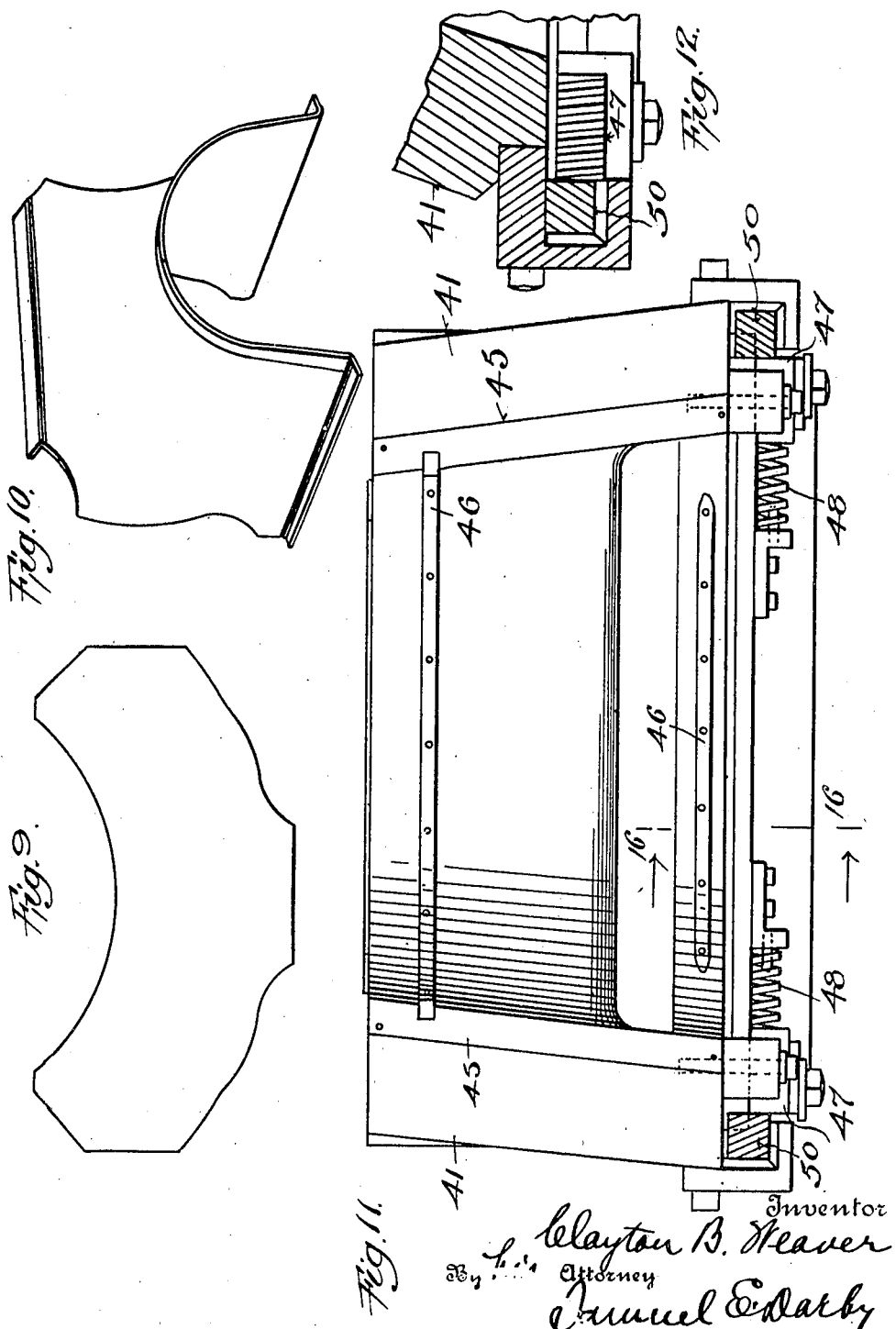

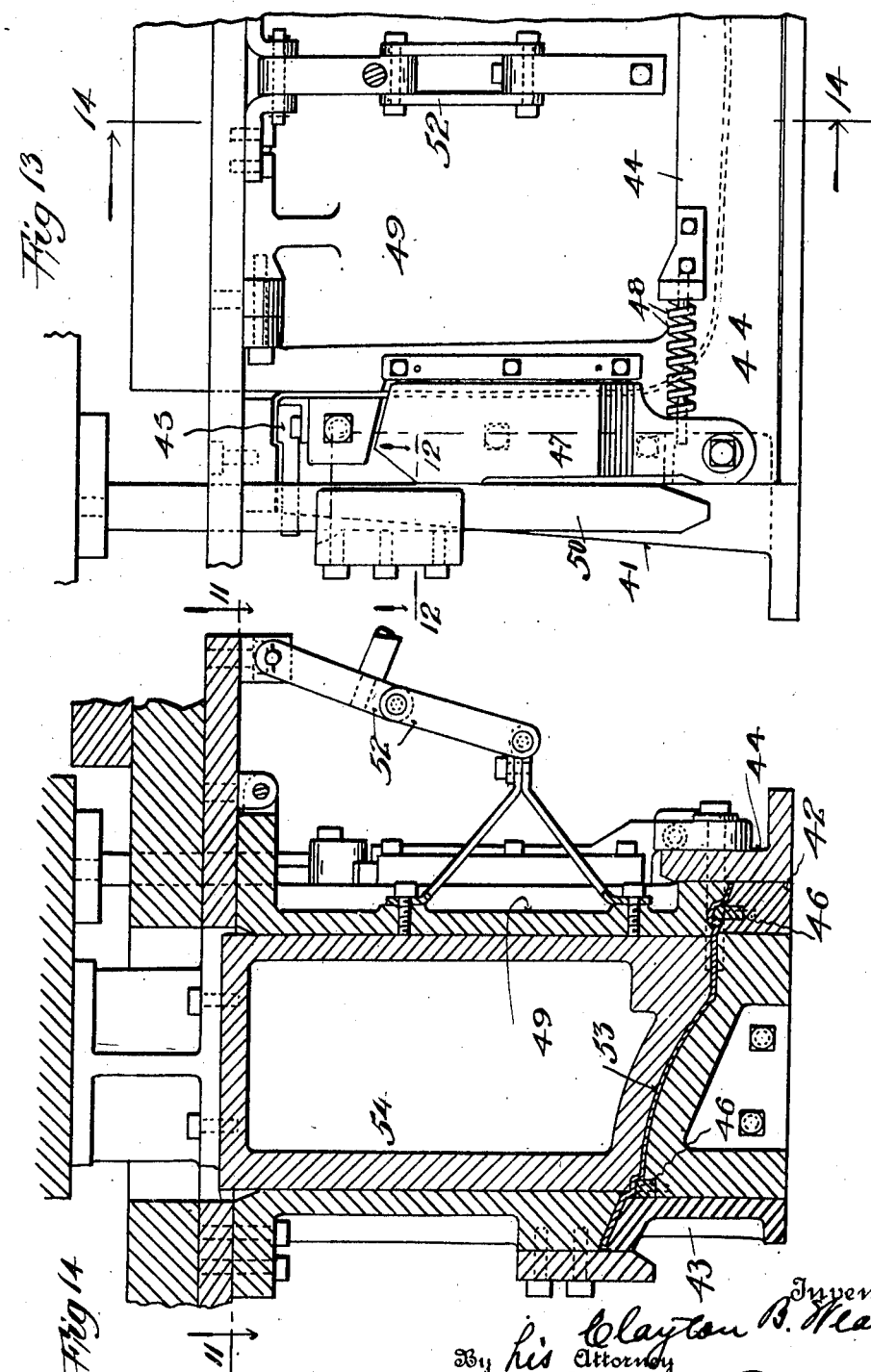

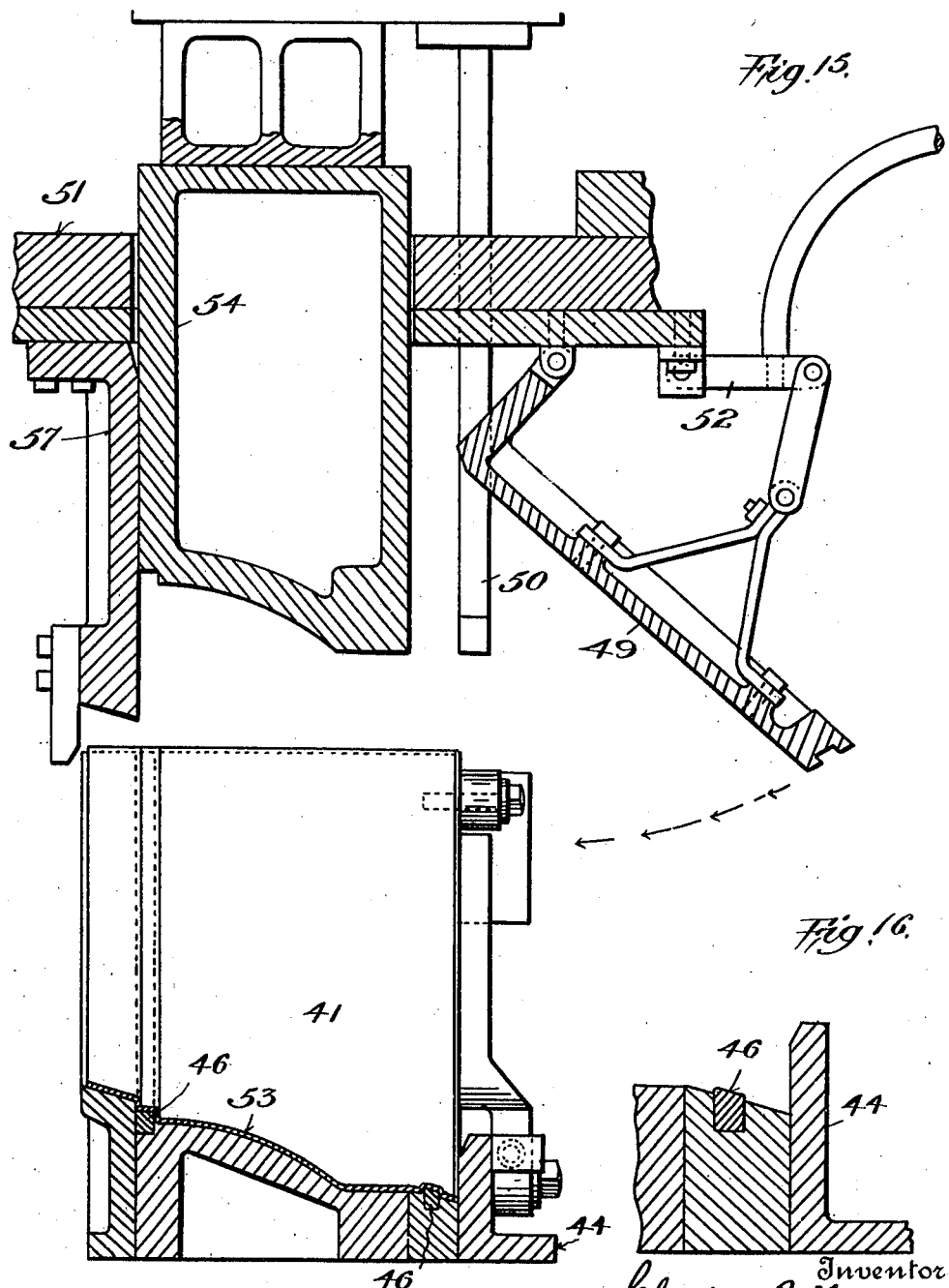

UNITED STATES PATENT OFFICE.

CLAYTON B. WEAVER, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA.

METHOD OF MAKING IRREGULARLY-SHAPED STAMPINGS.

1,308,769.  Specification of Letters Patent.  Patented July 8, 1919.

Original application filed February 25, 1915, Serial No. 10,455. Divided and this application filed July 19, 1916. Serial No. 110,180.

*To all whom it may concern:*

Be it known that I, CLAYTON B. WEAVER, a citizen of the United States, residing at Philadelphia, in the county of Philadelphia, State of Pennsylvania, have made a certain new and useful Invention in Methods of Making Irregularly-Shaped Stampings, of which the following is a specification.

This invention relates to the method of making irregularly shaped stampings and involves subject-matter divided from my application Serial No. 10,455, filed Feb. 25, 1915.

The object of the invention is to provide a method of making irregularly shaped stampings which is simple and effective, and carried out in one operation without diminution of the thickness of the sheet from which such stamping is produced, and without wrinkling the product produced.

Other objects of the invention will appear more fully hereinafter.

The invention consists substantially in the mode of operation hereinafter more fully set forth, as illustrated in the accompanying drawings, and finally pointed out in the appended claims.

Referring to the accompanying drawings:—

Figure 1 is a plan view of a sheet steel plate which has been trimmed to the desired outline preparatory to being stretched into the desired irregular shape in accordance with the principles of my invention.

Fig. 2 is a view showing the trimmed sheet stretched into the required shape to produce a portion of a sheet steel automobile body.

Fig. 3 is a view partly in perspective, parts in vertical transverse section, showing a work holder or seat in which the preliminarily trimmed and formed sheet is received, preparatory to being stretched into the required shape.

Fig. 4 is a view in top plan of the work holder or seat shown in Fig. 3, parts in section on the line 4, 4, Fig. 5.

Fig. 5 is a view in front elevation of the construction shown in Fig. 4, with the clamping and shaping dies lowered and the gate closed.

Fig. 6 is a view in vertical section on the line 6, 6, Fig. 5, showing the stretching die advanced to its position of full working stroke.

Fig. 7 is a view in vertical section on the line 7, 7, Fig. 4.

Fig. 8 is a broken view in section on the line 8, 8, Fig. 7, with the clamping and shaping or stretching dies lowered.

Fig. 9 is a view similar to Fig. 1, showing a blank steel sheet trimmed to the required outline to be stretched into shape to form another portion of a sheet steel automobile body in accordance with my invention.

Fig. 10 is a perspective view of a completed automobile body cowl produced in accordance with my invention.

Fig. 11 is a top plan view, partly in horizontal section on the line 11, 11, Fig. 14, of a work holder for producing the irregularly shaped cowl shown in Fig. 10.

Fig. 12 is a broken detail view in section on the line 12, 12, Fig. 13.

Fig. 13 is a view in front elevation, parts broken off, of the work holder shown in Fig. 11, the gate being closed and the clamping and stretching dies being advanced to the limits of their working stroke.

Fig. 14 is a view in vertical section on the line 14, 14, Fig. 13.

Fig. 15 is a view similar to Fig. 14 showing the clamping and stretching or shaping dies raised out of the work holder and the gate open.

Fig. 16 is a broken detail view in section on the line 16, 16, Fig. 11.

The same part is designated by the same reference numeral wherever it occurs throughout the several views.

Heretofore it has been the universal custom to produce by handwork large sheet steel stampings of irregular shape in the manufacture of automobile bodies, such as fenders, cowls, shrouds, body shells, and other parts. This method of producing large irregularly shaped stampings is slow and exceedingly expensive, involving repeated handlings and annealing of each individual piece. The use of different machines and dies through which such stampings are successively passed is equally objectionable inasmuch as such method involves unnecessary and repeated handlings of each individual piece, which greatly adds to the cost. The production of small sized stampings of irregular shapes has been attempted by making the dies in different pieces which are soldered together, the seams being painted over. The acid used in the solder, however, rusts through the paint with the result that the product or stamping produced shows the line of the seam in the form of an uneven line or ridge. Even with the exercise of the utmost care it has been found impossible to prevent the line of the seams of sectional dies from showing in the stampings produced. This trouble is greatly magnified in the production of large stampings of irregular form such as fenders, cowls, shrouds, seat backs, body shells and other portions of sheet steel automobile bodies, where symmetry and neatness of appearence is of the highest importance.

It is among the special objects of the present invention to provide a method of producing such large irregularly shaped sheet steel articles which avoids, obviates and eliminates the objections above noted, and large irregularly shaped sheet steel parts are produced in perfectly smooth contour and condition, and at a single stroke of a single stretching or shaping die, thereby enabling me to produce the stampings quickly, easily and inexpensively, and to avoid the large expense incident to repeated handlings of individual pieces, as well as the danger of marring the appearance and smoothness of contour or surface of the stamping through unsightly ridges or outlines of die seams appearing therein.

It is also among the special purposes of my invention to provide a method of the nature referred to and accomplishing the results above set forth without increasing or decreasing the thickness of the sheet metal plate being operated upon.

In carrying out my invention the first step is to trim a sheet steel blank to the required outline, as indicated, for example, in Figs. 1 and 9. The blank, thus trimmed, is then roughly bent by hand into the approximate shape of a work holder preliminary to being inserted in the holder. The trimmed and preliminarily shaped blank is then placed in position in a suitable work holder and securely clamped and rigidly held at its edges, in fact throughout the entire area of the sheet outside of the portion which is to be formed into the required irregular shape. I then proceed to stretch the unclamped area of the sheet into the desired irregular shape. The stretching operation, by which the steel sheet is formed into the desired irregular shape, in accordance with my invention, is carried out in a manner which avoids increasing or decreasing the thickness of the sheet, which would be exceedingly objectionable. This stretching step in the operation may be carried out in many specifically different ways, the means employed to accomplish the result being of no importance so far as the method involved is concerned.

The result of the operation is the production, rapidly and inexpensively, of stampings stretched and formed into the required irregular shape in beautifully smooth and finished condition, free from creases or wrinkles, or unsightly outline of die seams, and of uniform thickness throughout.

The process described may be carried out in various ways, and by means of a wide variety of forms of apparatus. In the accompanying drawings I have shown illustrative apparatus suitable for carrying out the process of my invention.

Referring particularly to Figs. 3, 4, 5, 6, 7, and 8 I have shown a work holder consisting essentially of side portions 17, in the form of vertical standards suitably bolted or otherwise anchored to a foundation 18. The side portions 17 are connected together at their front and rear lower portions by cross members 19, 20, and at their upper horizontal edges said side members are curved to the desired shape, as indicated at 21, over which the bent ends 22 of the stampings are clamped and shaped during the operation of the apparatus.

The side members 17 and their connecting members 19, 20, constitute a holder for the trimmed and preliminarily shaped blank. The upper supporting surfaces of cross members 19, 20, respectively lie in different horizontal planes. This facilitates the introduction and seating of the blank sheet in the holder. A horizontal retainer bar 23 is carried by the member 19. The blank after being preliminarily bent into shape to be received in the holder is inserted therein with the front and rear horizontal edges resting on the members 19, 20, and the bent end portions extending over the curved shaping surfaces 21. In order to prevent the sheet or blank from becoming wrinkled or creased while being stretched into the required shape, the horizontal and vertical front and rear edge portions thereof should be efficiently clamped or held. The members 19, 20, and the surfaces 21, may serve as clamping surfaces for the horizontal portions of the blank sheet edges. The vertical front and rear edge portions of the sheet edges may be clamped and held in any suitable manner, as, for example, by means of clamping levers 24, pivotally mounted at 25, and adapted to clamp against an opposing surface with the edge of the blank sheet interposed therebetween. A spring 27, acting upon a tail extension 26 of said lever serves to keep the latter out of clamping engagement with the opposing surface. The levers 24 may be guided by keepers 28.

Coöperating with the supporting surfaces of members 19, 20, and the curved surfaces 21, and levers 24, to effect the clamping of the plate edges is a clamping die 30, having horizontal side portions 31, which coöperate with the curved portions 21 of the holder to clamp the curved portions 22 of the blank therebetween, and also having the rear member 32, see Fig. 6, which coöperates with member 20 of the holder to clamp the rear horizontal edge portion of the blank therebetween. A retainer 33 extends below the clamping surface of member 32, to prevent displacement of the blank during the advance of the clamping die to its work. A swinging door 34, is horizontally hinged at 35, to the clamping die. A toggle lever construction 36 serves to swing the door into open or closed position. This door is closed before the clamping die is advanced, and during the advancing movement of the clamping die the lower edge of the door clamps the front edge of the blank sheet against the supporting surface of member 19. A raised gripping strip 37, may serve to insure a gripping and clamping action between these members. Vertically depending wedge members 38, carried by the clamping die serve to engage and rack the clamp levers 24, into clamping engagement with the side edges of the door with the vertical edge portions of the sheet blank engaged therebetween.

After the clamping die has advanced to its work and effects the gripping and clamping action above described upon the edges of the sheet blank, the stretching operation is performed upon the unclamped area of the blank sheet to produce the desired irregular shape. This may be accomplished in any suitable or convenient manner. In the illustrative arrangement shown as one means for accomplishing the desired result, a die 40 is employed. This die is formed in one single piece presenting an unbroken continuous working surface shaped to the desired configuration according to the character of the stamping to be produced. This die, when advanced to its work engages the unclamped area of the sheet blank and stretches or shapes the same into the desired configuration, without varying the thickness of the sheet at any point and without producing wrinkles, creases or seam marks in the surface of the blank.

The stretching and clamping dies are then withdrawn, the gate opened and the completed article is removed. Another blank is then inserted and the above described operation is repeated.

The important problem involved is to stretch a large sheet steel blank into an irregularly shaped product. This result is secured according to the process above described by firmly and efficiently clamping or holding the edges of the blank and then stretching the unclamped area of the blank into the required shape. In effecting the stretching operation the metal of the blank is drawn from all directions thereby avoiding diminution or increase of the thickness of the blank at any point. The process is carried out rapidly and uniform products are produced. By clamping or holding the horizontal front and rear edge portions of the blank at respectively different elevations the stretching operation is efficiently carried out.

Of course it is not essential that the clamping die be provided with a hinged door. The clamping levers may operate against any suitable or convenient abutment.

In Figs. 11 to 16, I have shown another and similar arrangement for carrying out the process of my invention in the production of the product shown in Fig. 10. In this apparatus the work holder has side members 41, cross connecting members 42, 43, and a front retaining bar 44. The upper supporting edges of this holder are flat instead of being curved as in the case of the surfaces 21, and gripping ribs 45 and 46 aid in securing an efficient gripping action on the edges of the sheet blank. The clamp levers 47 are forced against the action of springs 48, against the vertical edges of the door 49, by means of depending arms 50, on the clamping plunger 51. The door 49 is opened and closed by toggle levers 52. In this instance the holder is provided with a bottom surface 53 of suitable configuration to receive the finished product when the stretching operation thereon is completed. This bottom surface is employed where the stamping is to be provided with a reverse curvature.

Having now set forth the objects and nature of my invention and the manner of carrying the same into practical operation, what I claim as new and useful and of my own invention and desire to secure by Letters Patent, is—

1. The method of producing large irregularly shaped sheet metal stampings, which consists in rigidly securing the sheet along its edges, and then simultaneously forming and stretching the entire unsecured area thereof into the required irregular shape by pressure applied thereto to one side only thereof.

2. The method which consists in first trimming a sheet metal blank to the desired contour, then preliminarily bending the trimmed sheet into the approximate shape required, then rigidly securing the edges of the bent sheet, and finally simultaneously forming and stretching the entire unsecured area of the bent sheet into the desired irregular shape by pressure applied thereto to one side only thereof.

3. The method of producing large irregularly shaped sheet metal stamping which consists in trimming a blank sheet to the desired contour, then bending the trimmed sheet into approximate preliminary form, then securing the edges of the preliminarily formed blank, and finally simultaneously forming and stretching the entire unsecured area of the blank into the desired irregular contour without varying the thickness of the sheet.

4. The method which consists in rigidly securing a sheet metal blank at its respective edges in different horizontal planes, and then simultaneously forming and stretching the entire unsecured area thereof into the required irregular shape by pressure applied to one side only thereof.

5. The method which consists in rigidly clamping the edges of a sheet metal blank and simultaneously forming and stretching the metal of the entire unclamped area of the blank from all directions to form the sheet into irregular shape without variation in the thickness of such area and by pressure applied to one side only thereof.

6. The method which consists in rigidly clamping the edges of a sheet metal blank and simultaneously forming and stretching the metal of the entire unclamped area of the blank equally from all directions into irregular shape by pressure applied to one surface only thereof.

In testimony whereof I have hereunto set my hand, in the presence of the subscribing witnesses, on this 17th day of July, A. D. 1916.

CLAYTON B. WEAVER.

Witnesses:
A. H. BUXBAUM,
N. J. LEIDY.